United States Patent
Alles et al.

(10) Patent No.: US 9,479,380 B2
(45) Date of Patent: Oct. 25, 2016

(54) SYSTEM AND METHOD FOR DETERMINING INTERMODULATION DISTORTION IN A RADIO FREQUENCY CHANNEL

(71) Applicant: CommScope Technologies LLC, Hickory, NC (US)

(72) Inventors: Martin C. Alles, Vienna, VA (US); Navin Srinivasan, Fairfax, VA (US); Thomas B. Gravely, Herndon, VA (US); Andrew Beck, Ashburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/646,924

(22) PCT Filed: Dec. 16, 2013

(86) PCT No.: PCT/US2013/075420
§ 371 (c)(1),
(2) Date: May 22, 2015

(87) PCT Pub. No.: WO2014/093972
PCT Pub. Date: Jun. 19, 2014

(65) Prior Publication Data

US 2015/0341062 A1 Nov. 26, 2015

Related U.S. Application Data

(60) Provisional application No. 61/737,500, filed on Dec. 14, 2012.

(51) Int. Cl.
*H04L 27/26* (2006.01)
*H04L 7/00* (2006.01)
(Continued)

(52) U.S. Cl.
CPC ......... *H04L 27/2678* (2013.01); *H04B 1/1027* (2013.01); *H04J 11/0023* (2013.01);
(Continued)

(58) Field of Classification Search
CPC .. H04B 1/1027; H04B 15/02; H04B 17/354; H04B 1/0475; H04B 1/7103; H04B 2001/1072; H04B 10/548; H04B 1/109; H04B 10/58; H04B 10/60; H04B 10/6163; H04B 1/719; H04B 1/005; H04L 27/2647; H04L 27/2678; H04L 5/0007; H04L 7/007; H04L 27/2627; H04L 27/0012; H04L 27/2666; H04J 11/0023; H04J 11/0066
See application file for complete search history.

(56) References Cited

U.S. PATENT DOCUMENTS

| | | | |
|---|---|---|---|
| 5,260,968 A * | 11/1993 | Gardner | H01Q 3/2605 375/347 |
| 2007/0281649 A1 | 12/2007 | Maeda et al. | |

(Continued)

FOREIGN PATENT DOCUMENTS

| | | |
|---|---|---|
| WO | 2008086745 | 7/2008 |
| WO | 2010151849 | 12/2010 |

OTHER PUBLICATIONS

U.S. Patent Office, "Office Action", "from U.S. Appl. No. 14/646,893", Feb. 9, 2016, pp. 1-13, Published in: US.

(Continued)

*Primary Examiner* — Vineeta Panwalkar
(74) *Attorney, Agent, or Firm* — Fogg & Powers LLC

(57) ABSTRACT

The present disclosure describes systems and methods for identifying a signal that is a product of two or more other signals. In an embodiment, the presence of intermodulation distortion in a communication system is determined by comparing a cyclic autocorrelation function ("CAF") of a complex envelop of signal content in a frequency bin, comparing the determined CAF with the CAF for a known signal type, and comparing a frequency of the signal content with the frequency of an RF channel in the communication system.

27 Claims, 6 Drawing Sheets

(51) Int. Cl.
  *H04L 27/00* (2006.01)
  *H04B 1/10* (2006.01)
  *H04J 11/00* (2006.01)
(52) U.S. Cl.
  CPC ............ *H04L 7/007* (2013.01); *H04L 27/0012* (2013.01); *H04L 27/2627* (2013.01); *H04L 27/2666* (2013.01)

(56) References Cited

U.S. PATENT DOCUMENTS

| | | | |
|---|---|---|---|
| 2008/0125071 A1* | 5/2008 | Maeda .................... | H04B 1/38 455/313 |
| 2011/0158211 A1 | 6/2011 | Gaal et al. | |
| 2012/0183030 A1 | 7/2012 | Turunen et al. | |
| 2012/0213102 A1 | 8/2012 | Harada et al. | |

OTHER PUBLICATIONS

U.S. Patent Office, "Office Action", "from U.S. Appl. No. 14/646,907", Feb. 18, 2016, pp. 1-16, Published in: US.

International Search Authority, "International Preliminary Report on Patentability for PCT Application No. PCT/US2013/075394", "from Foreign Counterpart to U.S. Appl. No. 14/646,893", Jun. 16, 2015, pp. 1-7, Published in: WO.

International Search Authority, "International Preliminary Report on Patentability for PCT Application No. PCT/US2013/075409", "from Foreign Counterpart to U.S. Appl. No. 14/646,907", Jun. 16, 2015, pp. 1-8, Published in: WO.

International Search Authority, "International Preliminary Report on Patentability for PCT Application No. PCT/US2013/075420", "from Foreign Counterpart to U.S. Appl. No. 14/646,924", Jun. 16, 2015, pp. 1-8, Published in: WO.

Bose et al., "Relialble Spectrum Sensing for Resource Allocation of Cognitive Radio Base WiMAX Femtocells", "IEEE Conference on Consumer Communications and Networking", Jan. 14, 2012, pp. 889-893, Publisher: IEEE.

Gharaibeh et al., "Statistical Modeling of the Interaction of Multiple Signals in Nonlinear RF Systems", "2002 IEEE MTT-S International Microwave Symposium Digest", Jun. 2, 2002, pp. 143-147, vol. 1, Publisher: IEEE, Published in: Piscataway, NJ.

Gray et al., "A Technique for Detecting AMPS Intermodulation Distrortion in an IS-95 CDMA Mobile", "IEEE 8th International Symposium on Personal, Indoor and Mobile Radio Communications", Sep. 1, 1997, pp. 361-365, No. 2, Publisher: IEEE, Published in: New York, NY.

Loo Peng Goh et al., "Feature Detector for DVB-T Signal in Multipath Fading Channel", "IEEE 2nd International Conference on Cognitive Radio Oriented Wireless Networks and Communications", Aug. 1, 2007, pp. 234-240, Publisher: IEEE, Published in: Piscataway, NJ.

Prakriya et al., "Efficient Nonlinear Channel Identification Using Cyclostationary Signal Analysis", Apr. 27, 1993, pp. IV-264-IV-267, vol. 4, Publisher: IEEE, Published in: Orlando, FL.

Tomic et al., "Impact of Nonlinear Devices in Software Radio Signals", "2012 IEEE 75th Vehicular Technology Conference", May 6, 2012, pp. 1-5, Publisher: IEEE.

\* cited by examiner

SYSTEM AND METHOD FOR DETERMINING INTERMODULATION DISTORTION IN A RADIO FREQUENCY CHANNEL

RELATED AND CO-PENDING APPLICATIONS

This application is a U.S. national stage application of the PCT Application entitled "System and Method for Determining Intermodulation Distortion In a Radio Frequency Channel", Serial Number PCT/US2013/075420 filed 16 Dec. 2013, which claims priority to U.S. provisional application entitled "Cyclostationarity Based Identification of Intermodulation Distortion", Ser. No. 61/737,500 filed 14 Dec. 2012. This application is related to each of the following U.S. national stage applications, each of which is filed concurrently herewith, of the following PCT applications: "System and Method for Cyclostationarity-Based Signal Identification", Serial Number PCT/US2013/075394, and "System and Method for Determining Intermodulation Distortion Of a Radio Frequency Product Signal", Serial Number PCT/US2013/075409. The entirety of each of the above applications is hereby incorporated herein by reference.

BACKGROUND

Intermodulation distortion is a form of signal distortion caused by an unwanted amplitude modulation of signals that occurs due to passage through a non-linear channel. Such intermodulation can cause additional signals that are present at various combinations of sums and differences of the frequencies that constituted the original source signals. Such intermodulation can cause unwanted signal components to appear in other frequency bands and cause interference to other useful signals. In addition, this intermodulation can cause signal distortion throughout the original band and thus reduce the quality of information-carrying signal transmissions.

The presence of intermodulation distortion, particularly on the downlink path, can be a serious problem for communication network operators. This distortion, which may corrupt existing communication signals and/or occupy frequency bands that are allocated for other purposes, can cause the communication network to fail to achieve its design throughput capacity. One known cause of intermodulation distortion is due to cabling and/or connector malfunction or is caused by other passive components. Such intermodulation distortion is referred to herein as Passive Intermodulation Distortion ("PIM"). Unfortunately, intermodulation distortion is not easy to identify without active investigation, such as disconnecting components and subjecting them to scrutiny and/or injecting test signals via sophisticated diagnostics equipment. Such investigation and testing is costly and time-consuming and requires at least a portion of the communication network to be out of operation for a period of time. Furthermore, cables, connectors, and other passive circuit elements may deteriorate over time due to a variety of reasons including weather and the local operating environment. Thus, for example, cables and connections that check out fine at the time of installation or testing may deteriorate without notice until they cause a decrement in network operation.

Intermodulation distortion is often present in many operational communication networks and the network operator may not be aware until the problem becomes large enough that is causes major interference with data and/or voice carrying communication channels.

Accordingly, there is a need for identifying signals which may be the result of intermodulation distortion, determining intermodulation distortion from two or more radio frequency ("RF") signals, and determining intermodulation distortion in a communication system which operates using known RF channels and a known communication signal type.

DETAILED DESCRIPTION

Figure 1:
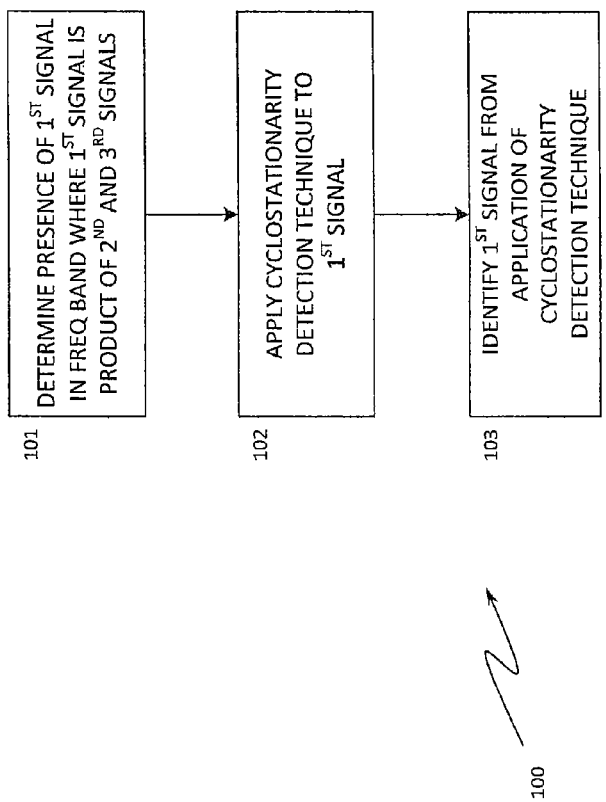
FIG. 1 is a flow chart for identifying a signal according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and methods, it is to be understood that the discussion is not intended to limit the scope of the present subject matter in any way and that the principles presented are equally applicable to other similar systems and methods for identifying a signal that is a product of two or more other signals.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for identifying signals which may be the result of intermodulation distortion, determining intermodulation distortion from two or more radio frequency ("RF") signals, and determining intermodulation distortion in a communication system which operates using known RF channels and a known communication signal type, are described. In an embodiment, the presence of a particular signal is determined and identified by applying a cyclostationarity detection technique. One such technique includes comparing a cyclic autocorrelation function of a product signal with the cyclic autocorrelation function of at least one of the signals which formed the product signal. In another embodiment, intermodulation distortion is determined by searching a frequency band for an RF product signal and identifying the RF product signal as an intermodulation distortion signal using a cyclostationarity detection technique. In a further embodiment, the presence of intermodulation distortion in a communication system is determined by comparing a cyclic autocorrelation function ("CAF") of a complex envelop of signal content in a frequency bin, comparing the determined CAF with the CAF for a known signal type, and comparing a frequency of the signal content with the frequency of an RF channel in the communication system. In yet a further embodiment, the presence of intermodulation distortion or other forms of interference in a communication system is determined through cyclostationary Spectral Correlation Density ("SCD"). The SCD is used to further evaluate the nature of the interfering signal, such as spectral energy, modulation type, etc. The SCD may be determined by a Frequency Smoothing and/or Time Smoothing algorithm.

The disclosed systems and methods may be used to identify intermodulation distortion, including passive intermodulation distortion in a system such as, but not limited to, a communication system including a wired or a wireless communication system. In an embodiment, the techniques include classifying a signal or signals according to their cyclostationary properties. Intermodulation distortion is identified by searching for cyclostationary properties of the product waveforms generated due to the underlying distorting process. One or more regions of signal spectrum may be sequentially examined for product waveforms with such properties. By applying certain hypotheses tests, the likelihood of intermodulation distortion is determined. The systems and methods may be applied to any digital signal type.

Passive intermodulation distortion is a form of signal distortion caused by an unwanted amplitude modulation of signals that occurs due to their passage through a non-linear channel and caused by passive components. Such intermodulation can cause additional, generally undesirable signals to be generated at various combinations of sums and differences of the frequencies that constituted the original source signal. It can thus cause unwanted signal components to appear in other frequency bands and cause interference to other signals. In addition, this intermodulation can cause signal distortion throughout the original band and thus reduce the quality of the transmissions. While the disclosure discusses examples using PIM, it will be readily understood by those of skill in the art that the described techniques and procedures are applicable to other types of intermodulation distortion and are not limited to PIM.

Consider a channel within which the desired source signal has frequency components at frequencies $f_1, f_2, f_3, \ldots f_N$.

Then, on passage through a non-linearity, the output signal has frequency components of the form $a_1 f_1 + a_2 f_2 + a_3 f_3 + \ldots + a_N f_N$ where the coefficients $a_1, a_2, \ldots, a_N$ are some arbitrary constants. One such case of particular interest is where so called third order intermodulation products are formed. This is the case where the absolute sum of the coefficients of two or more of the output signal frequency components equals three. For example:

$|a_1| + |a_2| + |a_3| = 3$, and where spurious signals are now generated at frequencies such as $(f_1 + f_2 - f_3), (2f_1 - f_2), (2f_2 - f_3)$.

More generally the absolute sum of the terms $a_i$ is referred to as the order of the intermodulation. Cases where this order is equal to 3, 5, or 7 are the most deleterious, and the third order terms are often the dominant contributors.

For a more detailed understanding of the process giving rise to these spurious frequency terms, let us consider that we have a channel in which we ideally have the signals $x_1(t)\sin(2\pi f_1 t)$, $x_2(t)\sin(2\pi f_2 t)$, $x_3(t)\sin(2\pi f_3 t)$, where $x_1(t)$, $x_2(t)$ and $x_3(t)$ are narrow band signals relative to the total channel bandwidth and $f_1$, $f_2$, and $f_3$ are frequencies such that the signals occur with no overlap within the channel in the ideal case (the signals are spectrally disjoint). As an exemplary, non-limiting, illustration of the concepts involved, assume that there is a non-linearity at some point in the signal path which cubes the entire channel content. It is noted that this is an extreme situation, but useful to illustrate the concepts involved. More generally, the cube typically occurs as one term of a sum of terms in the channel output. Taking the cube of an expression is a non-linear operation and the output of the channel is then expressible as $$(x_1(t)\sin(2\pi f_1 t) + x_2(t)\sin(2\pi f_2 t) + x_3(t)\sin(2\pi f_3 t))^3 \quad (1.1)$$

The expansion of the terms in this equation give rise to the following, terms:

$$\begin{aligned}&x_1^3(t)\sin^3(2\pi f_1 t) + x_2^3(t)\sin^3(2\pi f_2 t) + x_3^3(t)\sin^3(2\pi f_3 t) + \\&2x_1^2(t)\sin^2(2\pi f_1 t)x_2(t)\sin(2\pi f_2 t) + 2x_1^2(t)\sin^2 \\&(2\pi f_1 t)x_3(t)\sin(2\pi f_3 t) + 2x_2^2(t)\sin^2(2\pi f_2 t)x_1(t)\sin \\&(2\pi f_1 t) + 2x_2^2(t)\sin^2(2\pi f_2 t)x_3(t)\sin(2\pi f_3 t) + 2x_3^2(t) \\&\sin^2(2\pi f_3 t)x_1(t)\sin(2\pi f_1 t) + 2x_3^2(t)\sin^2(2\pi f_3 t)x_2(t) \\&\sin(2\pi f_2 t) + 6x_1(t)\sin(2\pi f_1 t)x_2(t)\sin(2\pi f_2 t)x_3(t)\sin \\&(2\pi f_3 t) \quad (1.2)\end{aligned}$$

Now consider the fourth term of this expansion. This is $2x_1^2(t)\sin^2(2\pi f_1 t)x_2(t)\sin(2\pi f_2 t)$, which can be expanded using trigonometric identities as $x_1^2(t)x_2(t)\sin(2\pi f_2 t)(1 - \cos(4\pi f_1 t))$.

This can be further simplified to give $$x_1^2(t)x_2(t)\sin(2\pi f_2 t) - \tfrac{1}{2}(x_1^2(t)x_2(t)(\sin(2\pi f_2 t + 4\pi f_1 t)) - \tfrac{1}{2}(x_1^2(t)x_2(t)\sin(2\pi f_2 t - 4\pi f_1 t) \quad (1.3)$$

Examining the three terms in equation 1.3, we note that the first term is an interfering signal at the frequency $f_2$, the third term is a signal at frequency $f_2 - 2f_1$ and the second term is a signal at frequency $f_2 + 2f_1$. The second term is the most likely to lie outside the frequency band containing the signals, and the second and third are examples where the absolute sum of the multipliers on the frequency terms is three, as mentioned earlier. We also observe that the signal content for these terms is the product of the square of one of the original signals and another original signal. Thus in the case of the second term one signal has been squared and multiplied by another and the whole product shifted out to a new frequency of $f_2 + 2f_1$. We can also observe that this is one single term in the expansion given by equation 1.2. The other terms will produce similar frequency shifted products of the original signals. The effect of intermodulation distortion can thus be interpreted in terms of the multiplication of distinct signals having first been raised to small integer powers (such as 1, 2, 3, etc.) and various frequency shifts applied to the resulting product signals.

More typically, the entire channel content is not cubed; a squared, cubed or other non-linear term adds to the channel content. For example if the signal into the channel is y(t), the output could be of the form:

$$z(t)=a_1 y(t)+a_2 y^2(t)+a_3 y^3(t)+\ldots,$$

where $a_1$, $a_2$, $a_3$ etc. are some constants. In a channel with no intermodulation distortion a is zero for all values i>1 and if there is intermodulation distortion $a_i$ is non zero for some values of i. Generally the cases of concern have $a_i \neq 0$ for i=2,3.

As stated above, passive intermodulation distortion on the downlink path due, e.g., to cabling and/or connector malfunction can be a serious problem for communication system operators. This distortion, by corrupting existing signals and by occupying bands that are allocated for other purposes, can cause the network to fail in achieving its designed throughput capacity.

Embodiments of the present disclosure propose a novel solution to the problem of identifying intermodulation distortion, including PIM, in a system by using techniques that classify signals according to their cyclostationary properties. The focus of the following description is on the LTE (Long Term Evolution) wireless communication standard, however, those of skill in the art will readily understand that the general principles can be equally applied to any other protocol or signal type with distinguishing cyclostationary features. In addition the described techniques and procedures may also be applied to the products of one signal type with another provided such product signals also exhibit cyclostationary features.

Cyclostationarity of LTE Signals

Cyclostationarity techniques are used in the field of cognitive radio to hypothesize the existence and parameters of various wireless protocols. Since PIM can cause a signal to produce artifacts of itself at frequencies other than intended, it is sensible to examine whether such artifacts can be found using cyclostationarity techniques. As we have observed in the previous section, if the signals present in some communication channel are corrupted due to the presence of a channel non-linearity, the resultant aggregate signal can have various original signal products shifted by various frequencies.

As discussed above, intermodulation distortion results in the product of integer powers of distinct signals distributed both in the original signal bandwidth and out of this bandwidth. Embodiments of the present disclosure consider the intermodulation products caused due to non-linearities (cabling defects, faulty connections, etc.) throughout a signal reception or transmission system. Other embodiments choose certain frequency bands to search for "unexpected signals" using cyclostationarity techniques. To clarify the meaning of an unexpected signal as used herein, consider a downlink signal from a communication network operator. The communication network operator typically has some assigned bandwidth for the aggregate of all the communication signals in the communication network, an aggregate that could be of the order of several tens of MHz. In this bandwidth, the communication network operator likely has multiple cellular protocols in operation. Some of this bandwidth is assigned to LTE, other bandwidth is assigned to other protocols, perhaps even some residual of protocols such as GSM (Global System for Mobile Communications) or NRTT (Single Carrier Radio Transmission Technology). There may also be certain unused pieces of spectrum that the operator has license to but does not use (guard bands, unallocated spectrum, etc.) There also may be certain bands between or adjacent to the assigned bandwidth that are reserved for special purposes (national security, etc.) in which communication is restricted and which bands are often not occupied by signals. Thus, an unexpected signal is a signal component that the communication network operator had no desire to generate but which is nonetheless produced by, for example, defects in the communication network infrastructure.

Suppose several LTE signals are present in the source signals of this communication network operator's downlink. When intermodulation distortion occurs, the signals mutually amplitude modulate each other and cause spurious signals to emerge elsewhere as described above. As a simple, non-limiting, example, consider a first LTE signal centered at frequency $f_1$ and a second LTE signal centered at frequency $f_2$. The intermodulation distortion (assuming third order terms exist) can now produce a product signal at a frequency $2f_2-f_1$. It can also produce a product signal at $2f_2+f_1$. Extending this to all possible LTE signals at various frequencies we see that a whole range of possible unwanted product signals can emerge at a whole range of various frequencies.

As is known in the art, LTE signals are generated as Orthogonal Frequency Division Multiplexed ("OFDM") signals. To examine the features of the product waveforms more carefully, consider two synchronized (i.e., symbol start times coincident) OFDM signals $s_1(t)$ and $s_2(t)$ at two distinct frequencies $f_1$ and $f_2$. Utilizing the complex envelope of each waveform, we can then write these signals as:

$$s_1(t)=\Re\{\tilde{s}_1(t)e^{(j2\pi f_1 t)}\}$$

$$s_2(t)=\Re\{\tilde{s}_2(t)e^{(j2\pi f_2 t)}\}$$

Consider a typical term such as $p(t)=s_1(t)^2 s_2(t)$ that may arise in the passage of the sum of these OFDM signals through a non-linearity. For example, p(t) could occur as a third order intermodulation distortion. Both $s_1(t)$ and $s_2(t)$ exhibit non-conjugate cyclostationarity. To see this, we can write $\tilde{s}_1(t)$ in the OFDM format as $$\sum_{n=-\infty}^{\infty} \sum_{1}^{N_c} d_{ni} e^{(j2\pi i \Delta f(t-nT_s-\varepsilon))} r(t-nT_s-\varepsilon) \quad (2.3)$$

where $d_{ni}$ are the complex symbols (QAM or PSK) in each symbol time $T_s$, n is the symbol counter, $\varepsilon$ is the unknown symbol timing, $N_c$ is the number of subcarriers, $\Delta f$ is the subcarrier frequency spacing, and r(t) is a rectangular pulse of width $T_s$. The symbol time $T_s=T_u+T_g$ where $T_u$ is the useful symbol time and $T_g$ is the guard time. The non-conjugate Cyclic Autocorrelation Function ("CAF") for the complex signal $\tilde{s}_1(t)$ is defined by $$R_{\tilde{s}_1 \tilde{s}_1}^{\alpha}(\tau) = \lim_{T \to \infty} \frac{1}{T} \int_{-\frac{T}{2}}^{\frac{T}{2}} E\{\tilde{s}_1(t)\tilde{s}_1^*(t+\tau)\}e^{(j2\pi\alpha t)} dt, \quad (2.4)$$

where E{.} is the expectation operator. For a non-cyclostationary signal, $R_{\tilde{s}_1 \tilde{s}_1}^{\alpha}(t,\tau)=0$ for all $\alpha \neq 0$. Any nonzero value of $\alpha$ for which the CAF is non-zero is called a cycle frequency of the signal $s_1(t)$. The time varying non-conjugate autocorrelation of the OFDM signal $$R_{s_j s_i}(t,\tau) = E\{\tilde{s}_1(t)\tilde{s}_1^*(t+\tau)\}$$

can be written as $$R_{s_1 s_1}(t,\tau) = E\left\{\sum_{n=-\infty}^{\infty}\sum_{i=1}^{N_c} d_{ni} e^{(j2\pi i \Delta f(t-nT_s-\varepsilon))} r(t-nT_s-\varepsilon) \sum_{m=-\infty}^{\infty}\sum_{k=1}^{N_c} d_{mk}^* e^{(-j2\pi k \Delta f(t+\tau-mT_s-\varepsilon))} r(t+\tau-mT_s-\varepsilon)\right\} \quad (2.5)$$

It may be noted that the only random quantities over which the expectation operates are the constellation points $d_{ni}$ and $d_{mk}^*$. The only surviving terms in equation (2.5) are those terms where the complex modulation symbols are exact conjugates of each other. These terms occur only when $\tau < T_s$ and in such cases the shifted pulse waveforms intersect in a new pulse waveform of shortened duration resulting in a waveform that is periodic in t. Thus equation (2.5) simplifies to give $$\sum_{m=-\infty}^{\infty} A \frac{\sin(\pi N_c \Delta f \tau)}{\sin(\pi \Delta f \tau)} r(t-nT_s-\varepsilon) r(t+\tau-nT_s-\varepsilon) \quad (2.6)$$

where A is a scalar real multiplier dependent on the specific constellation $d_i$ and mapping of binary data to QAM or PSK constellation points. This equation is clearly periodic in t with period $T_s$, and hence when the CAF is generated will show spectral lines for certain values of $\alpha$. It is instructive to consider what happens when $\tau = T_u$. In this case the fractional term in equation (2.6) results in unity. Thus when the data is moved to overlap at exactly the cyclic prefix, the amplitude of the autocorrelation is at a relative maximum. Thus the existence of the cyclic prefix makes the cyclostationary features of OFDM rise out of the noise floor and make it detectable.

For purposes of this discussion, it is not sufficient that $s_1(t)$ and $s_2(t)$ exhibit cyclostationarity. We want to take a particular third order term such as $s_1^2(t)s_2(t)$ and show that it too exhibits cyclostationarity. More generally, we want a product such as $p(t)=s_1^2(t+\beta)s_2(t)$ to also exhibit cyclostationarity, at least when $\beta$ is a small fraction of $T_s$. To show this, we must first attempt to write the product waveform in terms of its Complex Envelope ("CE"). Now $s_1(t)$ can be written as $$s_1(t) = \Re\{\tilde{s}_1(t)e^{(j2\pi f_1 t)}\} = \frac{1}{2}[\tilde{s}_1(t)e^{(j2\pi f_1 t)} + \tilde{s}_1^*(t)e^{(-j2\pi f_1 t)}], \quad (2.7)$$

and similarly $$s_2(t) = \frac{1}{2}[\tilde{s}_2(t)e^{(j2\pi f_2 t)} + \tilde{s}_2^*(t)e^{(j2\pi f_2 t)}]. \quad (2.8)$$

Now we can square the expression for $s_1(t)$ to obtain $$s_1^2 = \frac{1}{4}[\tilde{s}_1^2(t)e^{(j4\pi f_1 t)} + \tilde{s}_1^{*2}(t)e^{(-j4\pi f_1 t)} + 2\tilde{s}_1(t)\tilde{s}_1^*(t)] \quad (2.9)$$

When we multiply out the terms in the expansion of $s_1^2(t)s_2(t)$ we find that this product can be generated from the complex envelopes given by $s_1^2(t)s_2^*(t)$, $\tilde{s}_1^2(t)\tilde{s}_2(t)$, and $|\tilde{s}_1(t)|^2\tilde{s}_2(t)$, inclusive of the conjugates of each term, and where in the first case the applicable carrier frequency is $2f_1-f_2$, in the second case the carrier frequency is $2f_1+f_2$ and in the third case it is $f_2$.

Thus, the question now becomes whether any of the above three components of the product waveform is capable of exhibiting cyclostationarity. It turns out that all three exhibit cyclostationarity. Let us show this first in the simplified case where $\beta = 0$ (synchronized signals).

We now present a novel and useful result which greatly simplifies the task of exhibiting cyclostationarity for these waveforms: the product of the CE's of any number of synchronized OFDM signals is the CE of a different OFDM signal. To show this, consider the product of two OFDM CEs, $$\sum_{n=-\infty}^{\infty}\sum_{i=1}^{N_c} d_{ni} e^{(j2\pi i \Delta f(t-nT_s-\varepsilon))} r(t-nT_s-\varepsilon) \sum_{m=-\infty}^{\infty}\sum_{k=1}^{N_c} d_{mk} e^{(j2\pi k \Delta f(t-mT_s-\varepsilon))} r(t-mT_s-\varepsilon), \quad (2.10)$$

which, noting that the only terms remaining when the two sums are multiplied are the terms with the same index on the pulse waveforms, results in $$\sum_{n=-\infty}^{\infty}\left\{\sum_{i=1}^{N_c} d_{ni} e^{(j2\pi i \Delta f(t-nT_s-\varepsilon))} \sum_{k=1}^{N_c} d_{nk} e^{(j2\pi k \Delta f(t-nT_s-\varepsilon))} r(t-nT_s-\varepsilon)\right\} = \\ \sum_{n=-\infty}^{\infty}\sum_{i=1}^{N_c}\sum_{k=1}^{N_c} d_{nk} d_{ni} e^{(j2\pi i \Delta f(t-nT_s-\varepsilon))} e^{(j2\pi k \Delta f(t-nT_s-\varepsilon))} r(t-nT_s-\varepsilon) = \\ \sum_{n=-\infty}^{\infty}\sum_{i=1}^{N_c}\sum_{k=1}^{N_c} d_{nk} d_{ni} e^{(j2\pi(i+k)\Delta f(t-nT_s-\varepsilon))} r(t-nT_s-\varepsilon) = \\ \sum_{n=-\infty}^{\infty}\sum_{m=1}^{2N_c} D_{nm} e^{(j2\pi m \Delta f(t-nT_s-\varepsilon))} r(t-nT_s-\varepsilon), \quad (2.11)$$

in which $m=(i+k)$ and $\{D_{()}\}$ is a new constellation. Equation (2.11) can now be recognized as identical to the CE of a different OFDM signal (e.g., equation (2.3)) whose constellation is formed by the product of the individual constellations of the two signals and where the span of the sub-carriers is the sum of the previous spans (with the same sub-carrier spacing). The extension to the product of more than two OFDM CEs follows by induction; for three terms, take the first two, apply the result and then apply it to the product of the first two and the third term.

This result makes it immediately obvious that all the terms referred to earlier in the product waveform will exhibit cyclostationarity with exactly the same cycle frequencies as the base signals. Thus for OFDM signals, all the PIM products (of any order) of synchronous signals will exhibit cyclostationarity. We also note that self-products, namely terms which involve integer powers of one particular signal, behave similarly.

Now consider the question of whether a product such as $p(t)=s_1(t+\beta)s_2(t)$ also exhibits cyclostationarity when $\beta \neq 0$. This is harder to demonstrate mathematically in an exact manner, so we will approach this differently.

Consider signals $s_1(t)$, $s_2(t)$ where the signal in any symbol time is not a sum of subcarriers but rather a single subcarrier. It is clear that the actual OFDM signals are then obtained by aggregating $N_c$ such signals in each symbol time, but it is easier to make the case by first focusing on the single carrier signals. As previously, we assume that the cyclic prefix fraction or guard time is the same for both signals. Now, placing our attention on a single symbol time, if the signals were synchronized, then the product signal content is the same in the first $[0,T_g]$ segment of p(t) and the final $[T_s-T_g,T_s]$ segment. That is, there is a repetition of the signal content that occurs with a delay $T_u$. This is another way to argue for the cyclostationary properties in the synchronized case.

Now let us assume that $\beta$ is a small fraction of $T_g$. Then, the effect of $\beta$ is to slightly stagger a symbol time of $s_1(t)$ with respect to a symbol time of $s_2(t)$. What we then see is that there is still a repetition of terms in the product in the segments $[0, T_g-\beta]$ and $[T_s-T_g+\beta,T_s]$. Thus, the autocorrelation of the product signal at delay $T_u$ will produce energy equal to that with zero delay. This means that there is still a repeated component in the product waveform, and hence implies the likely existence of a cyclostationary feature that may be detectable. As $\beta$ increases, this feature will diminish in size and when $\beta \geq T_g$ the feature should disappear. The most important observation here is that a cyclostationary feature may be observable if the de-synchronization (expressed using $\beta$) is small relative to the guard time.

Identifying Passive Intermodulation Distortion on LTE Signals

All of the possible frequencies or frequency bands where intermodulation products could possibly exist are computable given knowledge of the channel or frequency map used by the communication network operator. Let this set of possible frequencies (or frequency bands) at which undesirable LTE product signals occur be denoted by F. Then one can propose examining each candidate frequency or frequency band in F for the following hypotheses:

H1: Does it exhibit the presence of an LTE product signal? More strictly does a cyclostationarity analysis of this candidate frequency or frequency band exhibit a positive test for LTE?

H2: In an ideal situation, should this frequency or frequency band exhibit LTE cyclostationary features?

If H1 is answered in the affirmative and H2 in the negative, it is then possible for us to argue that the communication network operator clearly has a defect in his network. One possible and likely explanation for this defect is that he or she has unrecognized intermodulation distortion actively degrading the system.

One novel aspect in the exemplary embodiments is that we search for products of LTE signals (i.e., one LTE signal raised to some integer power times one or more other LTE signals raised to some integer powers) in the Radio Frequency domain, optionally convert these product signals to baseband and then apply cyclostationarity detection techniques to answer the hypotheses tests H1 and H2. Note that the signals are not always assumed to be perfectly synchronized; that is, one signal could have some offset in time with respect to where the other signal or signals starts.

In an embodiment, if we were searching for an intermodulation product at frequency $2f_2+f_1$, where $f_2$ and $f_1$ are the RF frequencies of the LTE signals, we might downconvert the signals by suitable quadrature downconversion using a frequency of $2f_2+f_1$ and then examine this baseband signal for LTE features. In another embodiment, the intermodulation product at frequency $2f_2+f_1$ need not be downconverted. We note that there is a plethora of possible linear frequency combinations that can be searched based mainly on a positive response to the query in H2. Our finding is that the LTE product signals exhibit a unique Cyclic Autocorrelation Function ("CAF") provided the cyclic prefix on the signals is not zero, and provided that the signals are synchronized to within approximately 75% of the cyclic prefix length. For example, if the cyclic prefix is of size 25% of the symbol time, we then need to be synchronized to within about 18% of the symbol time. Since we can identify LTE product signals in this manner, we then have a scheme that produces a positive result in the presence of intermodulation distortion. With respect to LTE, other embodiments can exploit the cyclostationary features of the LTE reference signal, where when we consider signal products we can additionally search for more features if one of the LTE signals was a reference signal.

In some variations of the LTE communication signals it may be necessary to provide further filtering of the signals in the time or frequency domain prior to applying cyclostationarity analysis. One such example is the case where LTE does not operate in the extended mode. In such cases the relative size of the Cyclic Prefix ("CP" or guard time) may change in some deterministic manner. In all such cases, by suitable excision of signal segments in the time domain the excised signals will preserve cyclostationary features. Such excision operations in time or filtering operations in frequency are contemplated herein and can precede any of the techniques presented in this disclosure.

In the time domain, different time intervals within LTE are expressed as multiples of a basic time unit $T_s=1/30720000$ seconds. The radio frame has a length of 10 ms; ($T_1=307200T_s$). Each frame is divided into ten equally sized sub-frames of 1 ms in length. Scheduling is done on a sub-frame basis for both the downlink and uplink. Each sub-frame may consists of two equally sized slots of 0.5 ms in length. Each slot in turn consists of a number of OFDM symbols which can be either seven (normal cyclic prefix) or six (extended cyclic prefix). The useful symbol time is Tu=$2048 \times T_s \approx 66.7$ μs. For the normal mode, the first symbol has a cyclic prefix of length TCP=$160 \times T_s \approx 5.2$ ρs. The remaining six symbols have a cyclic prefix of length TCP=$144 \times T_s \approx 4.7$ μs. The reason for a different CP length of the first symbol is to make the overall slot length in terms of time units divisible by 15360. For the extended mode, the cyclic prefix is $TCP_e=512 \times T_s \approx 16.7$ μs. By design, the CP is longer than the typical delay spread of a few microseconds typically encountered in practice. The normal cyclic prefix is used in urban cells and high data rate applications while the extended cyclic prefix is used in special cases like multi-cell broadcast and in very large cells (e.g. rural areas, low data rate applications). When the normal cyclic prefix is used, data extracted for cyclostationary analysis can be excised by removing the first symbol of every slot. In the extended mode, no such modification of the data is needed. In general, therefore, it is quite feasible, and contemplated herein, to accommodate small variations in signaling formats that may occlude cyclostationary features by intelligently modifying the extracted data prior to analysis.

With attention drawn to FIG. 1, a flow chart 100 for identifying a signal according to an embodiment of the present subject matter is presented. At block 101, the presence of a first signal in a frequency band is determined where the first signal is the product of a second and third signal. At block 102, a cyclostationarity detection technique is applied to the first signal. At block 103, the first signal is identified from the results of the application of the cyclostationarity detection technique to the first signal. In an embodiment, the cyclostationarity detection technique includes determining a cyclic autocorrelation function of the first signal. In another embodiment, the results of applying the cyclostationarity detection technique to the first signal include determining if the first signal includes a predetermined characteristic of either the second or third signal. The predetermined characteristic may be one or more of a cyclic prefix-induced cyclostationarity, a frame rate, and a chip rate.

In yet another embodiment, one or both of the second and third signals is a communication signal (e.g., a signal that is intended by the operator of a communication system to carry useful information), a communication signal in a wireless communication system, an Orthogonal Frequency Division Multiplexed ("OFDM") signal, or a Long Term Evolution ("LTE") signal. In still a further embodiment, one or both of the second and third signals is a communication signal in a wireless communication system but the first signal is not a communication signal in the wireless communication system. In yet still a further embodiment, one or both of the second and third signals is a tone, a modulated carrier, or noise.

Figure 2:
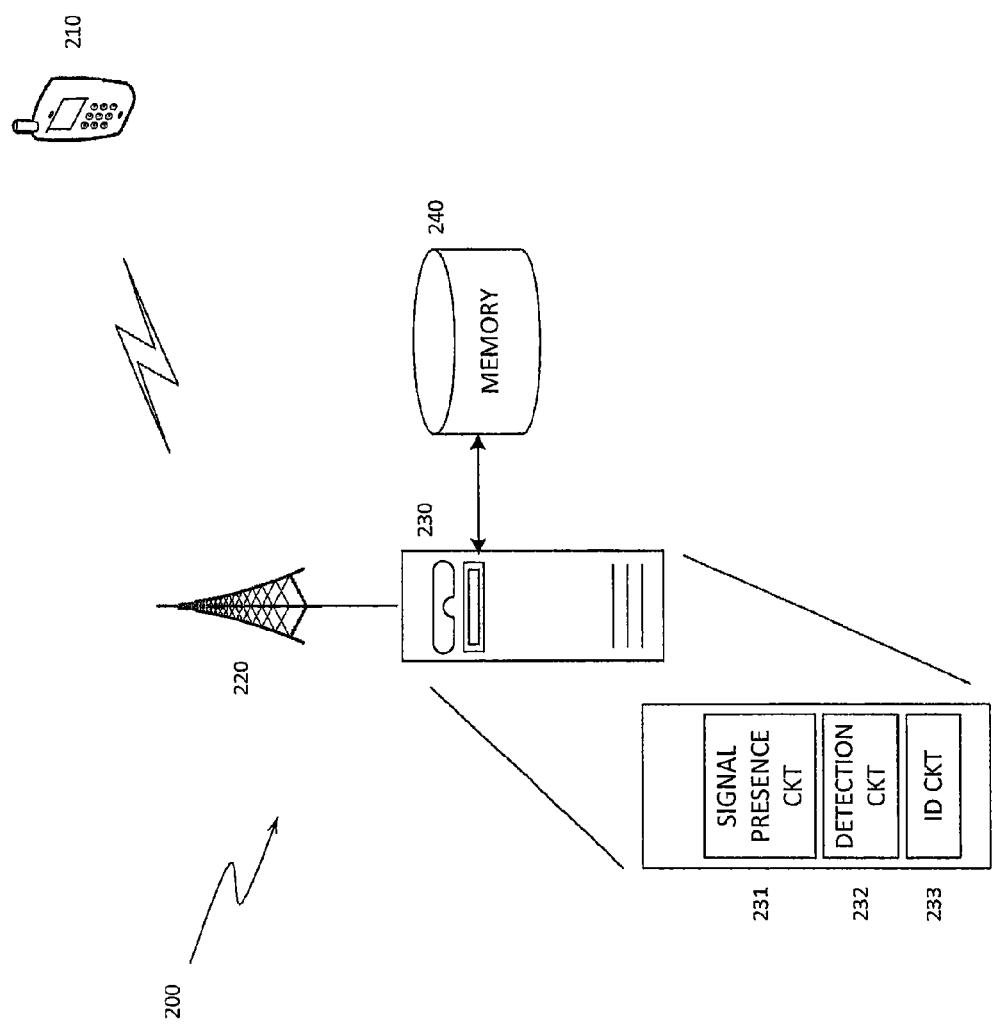
FIG. 2 is a functional block diagram for identifying a signal according to an embodiment of the present subject matter.

Now turning to FIG. 2, a functional block diagram 400 for identifying a signal according to an embodiment of the present subject matter is depicted. In an embodiment, mobile device 210 communicates, via radio frequency ("RF") uplink and downlink channels, as is known in the art, with wireless transmitter 220 in a wireless communication network. The uplink and/or downlink channel may be composed of one or more frequency bands. It will be understood by those of skill in the art that the present exemplary embodiment is non-limiting and that other embodiments of the present disclosure, including use in a wired system, are contemplated herein. The wireless communication network also includes a processor 230 which is operatively connected to transmitter 220 and a memory device 240. The processor 230 includes a signal presence circuit 231, a detection circuit 232, and an identification circuit 233.

In an embodiment, the signal presence circuit 231 determines the presence of a first signal in a frequency band, such as, but not limited to, a frequency band in a downlink channel, where the first signal is the product of a second and third signal. The detection circuit 232 applies a cyclostationarity detection technique to the first signal. The identification circuit 233 identifies the first signal from the results of the application of the cyclostationarity detection technique to the first signal in the detection circuit 232. In an embodiment, the detection circuit 232 includes circuitry which determines a cyclic autocorrelation function of the first signal. In another embodiment, the identification circuit 232 includes circuitry which determines if the first signal includes a predetermined characteristic of either the second or third signal. The predetermined characteristic may be one or more of a cyclic prefix-induced cyclostationarity, a frame rate, and a chip rate. The predetermined characteristic may be stored in the memory device 240.

In yet another embodiment, one or both of the second and third signals is a communication signal (e.g., a signal that is intended by the operator of a communication system to carry useful information) in either an uplink or downlink channel, a communication signal in a wireless communication system, an Orthogonal Frequency Division Multiplexed ("OFDM") signal, or a Long Term Evolution ("LTE") signal. In still a further embodiment, one or both of the second and third signals is a communication signal, in either an uplink or downlink channel, in a wireless communication system but the first signal is not a communication signal in the wireless communication system. In yet still a further embodiment, one or both of the second and third signals is a tone, a modulated carrier, or noise.

In another embodiment, the processor 230 is programmed using a non-transitory machine-readable medium which stores executable instructions to be executed by the processor 230 to implement a method of identifying a signal. In an embodiment, the method includes the steps of determining the presence of a first signal in a frequency band where the first signal is the product of a second and third signal, applying a cyclostationarity detection technique to the first signal, and identifying the first signal from the results of the application of the cyclostationarity detection technique to the first signal. In an embodiment, the cyclostationarity detection technique includes determining a cyclic autocorrelation function of the first signal. In another embodiment, the results of applying the cyclostationarity detection technique to the first signal include determining if the first signal includes a predetermined characteristic of either the second or third signal. The predetermined characteristic may be one or more of a cyclic prefix-induced cyclostationarity, a frame rate, and a chip rate.

In yet another embodiment, one or both of the second and third signals is a communication signal (e.g., a signal that is intended by the operator of a communication system to carry useful information), a communication signal in a wireless communication system, an Orthogonal Frequency Division Multiplexed ("OFDM") signal, or a Long Term Evolution ("LTE") signal. In still a further embodiment, one or both of the second and third signals is a communication signal in a wireless communication system but the first signal is not a communication signal in the wireless communication system. In yet still a further embodiment, one or both of the second and third signals is a tone, a modulated carrier, or noise.

Figure 3:
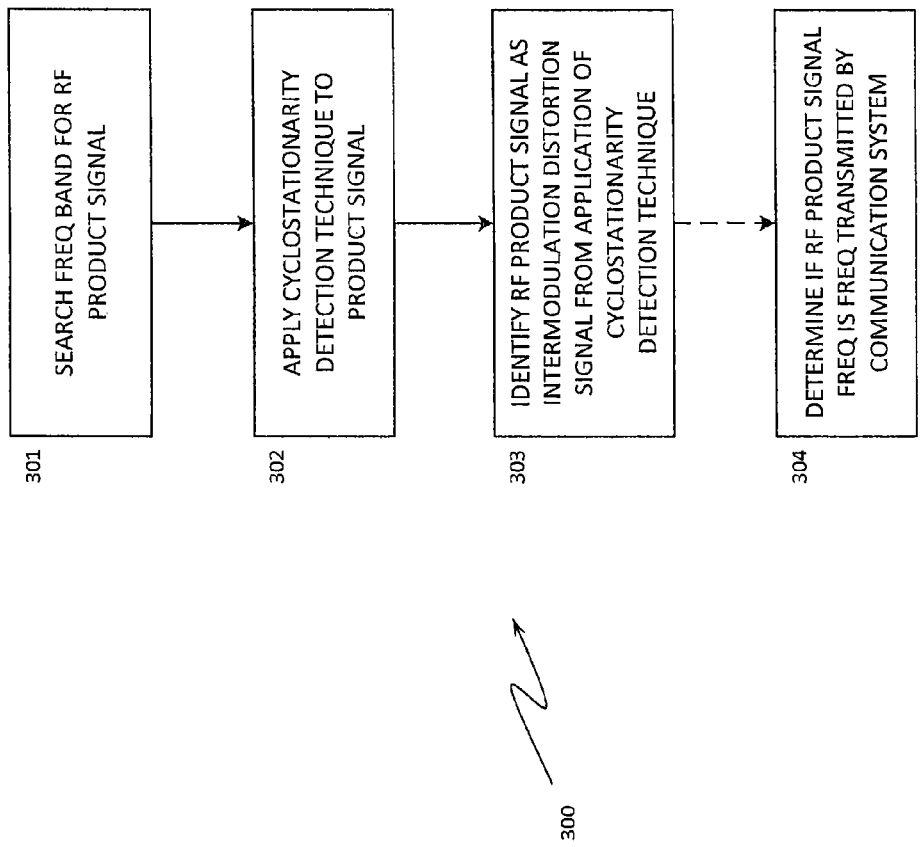
FIG. 3 is a flow chart for determining intermodulation distortion of a radio frequency product signal according to an embodiment of the present subject matter.

FIG. 3 illustrates a flow chart 300 for determining intermodulation distortion of a radio frequency product signal according to an embodiment of the present subject matter. At block 301, a frequency or a frequency band, in either an uplink or downlink channel, is searched for an RF product signal. The RF product signal is a product of a first RF signal raised to the power of a first integer and a second RF signal raised to the power of a second integer. Additionally, the first RF signal is at a first frequency or frequency band, the second RF signal is at a second frequency or frequency band, and the RF product signal is at a third frequency or frequency band. At block 302, a cyclostationarity detection technique is applied to the RF product signal. At block 303, the RF product signal is identified as an intermodulation distortion signal from the results of the application of the cyclostationarity detection technique to the RF product signal. In an embodiment, the first and second RF signals are transmitted by a communication system. In a further embodiment, at block 304 a determination is made as to whether the frequency or frequency band of the RF product signal is a frequency or frequency band transmitted by the communication system, i.e., whether the detected cyclostationary characteristic is expected in the frequency band.

In an embodiment, the first RF signal is transmitted by a first communication system and the second RF signal is transmitted by a second communication system. In a further embodiment, a determination is made as to whether the third frequency or frequency band is a frequency or frequency band transmitted by either the first or second communication system, i.e., whether the detected cyclostationary characteristic is expected in the frequency band. The first and second communication systems may operate using different communication protocols.

As discussed above, the RF product signal is a product of a first RF signal raised to the power of a first integer and a second RF signal raised to the power of a second integer. In an embodiment, the first and second integers are the same. In another embodiment, the sum of the first and second integers equals three.

In yet a further embodiment, the RF product signal includes a cyclic prefix, as is known in the art. In still a further embodiment, the first and second RF signals each include a cyclic prefix having a predetermined length and the first and second RF signals are synchronized to within at least 75% of the predetermined length of the cyclic prefix.

In an embodiment, the cyclostationarity detection technique includes determining a cyclic autocorrelation function of the first signal. In another embodiment, the results of applying the cyclostationarity detection technique to the RF product signal include determining if the RF product signal includes a predetermined characteristic of either the first or second RF signal. The predetermined characteristic may be one or more of a cyclic prefix-induced cyclostationarity, a frame rate, and a chip rate.

In yet another embodiment, one or both of the first and second RF signals is a communication signal (e.g., a signal that is intended by the operator of a communication system to carry useful information), a communication signal in a wireless communication system, an Orthogonal Frequency Division Multiplexed ("OFDM") signal, or a Long Term Evolution ("LTE") signal. In still a further embodiment, one or both of the first and second RF signals is a communication signal in a wireless communication system but the RF product signal is not a communication signal in the wireless communication system. In yet still a further embodiment, one or both of the first and second RF signals is a tone, a modulated carrier, or noise.

Figure 4:
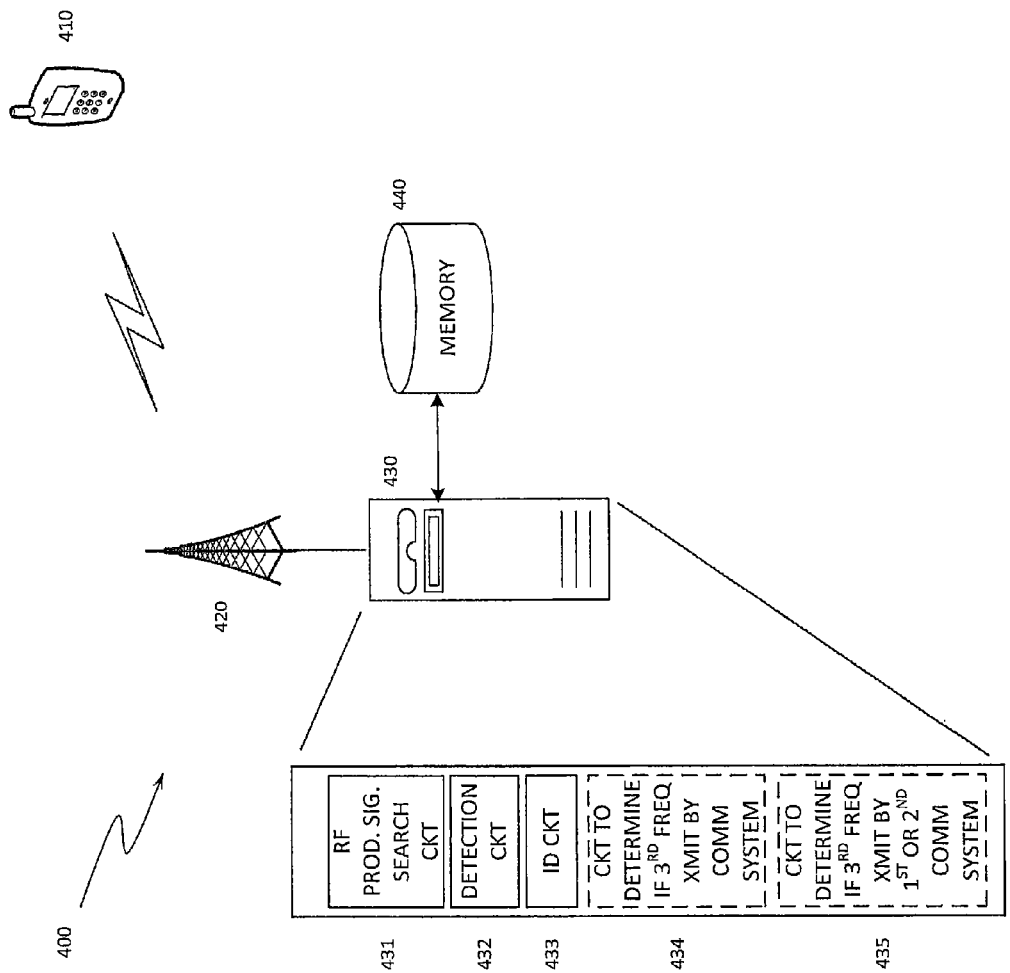
FIG. 4 is a functional block diagram for determining intermodulation distortion of a radio frequency product signal according to an embodiment of the present subject matter.

Considering FIG. 4, a functional block diagram 400 for determining intermodulation distortion of a radio frequency product signal according to an embodiment of the present subject matter is depicted. In an embodiment, mobile device 410 communicates, via radio frequency ("RF") uplink and downlink channels, as is known in the art, with wireless transmitter 420 in a wireless communication network. The uplink and/or downlink channel may be composed of one or more frequency bands. It will be understood by those of skill in the art that the present exemplary embodiment is non-limiting and that other embodiments of the present disclosure, including use in a wired system, are contemplated herein. The wireless communication network also includes a processor 430 which is operatively connected to transmitter 420 and a memory device 440. The processor 430 includes an RF product signal search circuit 431, a detection circuit 432, and an identification circuit 433. In further embodiments, the processor 430 further includes one or both of circuit 434 and circuit 435, as discussed in further detail below.

In an embodiment, the RF product signal search circuit 431 searches a frequency or a frequency band, in either an uplink or downlink channel, for an RF product signal. The RF product signal is a product of a first RF signal raised to the power of a first integer and a second RF signal raised to the power of a second integer. Additionally, the first RF signal is at a first frequency or frequency band, the second RF signal is at a second frequency or frequency band, and the RF product signal is at a third frequency or frequency band. The detection circuit 432 applies a cyclostationarity detection technique to the RF product signal. The identification circuit 433 identifies the RF product signal as an intermodulation distortion signal from the results of the application of the cyclostationarity detection technique to the RF product signal. In an embodiment, the first and second RF signals are transmitted by a communication system. In a further embodiment, circuit 434 determines whether the frequency or frequency band of the RF product signal is a frequency or frequency band transmitted by the communication system, i.e., whether the detected cyclostationary characteristic is expected in the frequency band.

In another embodiment, the first RF signal is transmitted by a first communication system and the second RF signal is transmitted by a second communication system. In a further embodiment, circuit 435 determines whether the third frequency or frequency band is a frequency or frequency band transmitted by either the first or second communication system, i.e., whether the detected cyclostationary characteristic is expected in the frequency band. The first and second communication systems may operate using different communication protocols.

As discussed above, the RF product signal is a product of a first RF signal raised to the power of a first integer and a second RF signal raised to the power of a second integer. In an embodiment, the first and second integers are the same. In another embodiment, the sum of the first and second integers equals three.

In yet a further embodiment, the RF product signal includes a cyclic prefix, as is known in the art. In still a further embodiment, the first and second RF signals each include a cyclic prefix having a predetermined length and the first and second RF signals are synchronized to within at least 75% of the predetermined length of the cyclic prefix.

In an embodiment, the cyclostationarity detection technique applied by the detection circuit 432 includes circuitry which determines a cyclic autocorrelation function of the RF product signal. In another embodiment, the identification circuit 433 includes circuitry which determines if the RF product signal includes a predetermined characteristic of either the first or second RF signal. The predetermined characteristic may be one or more of a cyclic prefix-induced cyclostationarity, a frame rate, and a chip rate.

In yet another embodiment, one or both of the first and second RF signals is a communication signal (e.g., a signal that is intended by the operator of a communication system to carry useful information), a communication signal in a wireless communication system, an Orthogonal Frequency Division Multiplexed ("OFDM") signal, or a Long Term Evolution ("LTE") signal. In still a further embodiment, one or both of the first and second RF signals is a communication signal in a wireless communication system but the RF product signal is not a communication signal in the wireless communication system. In yet still a further embodiment, one or both of the first and second RF signals is a tone, a modulated carrier, or noise.

In another embodiment, the processor 430 is programmed using a non-transitory machine-readable medium which stores executable instructions to be executed by the processor 430 to implement a method of determining intermodulation distortion. In an embodiment, the method includes the step of searching a frequency or a frequency band, in either an uplink or downlink channel, for an RF product signal. The RF product signal is a product of a first RF signal raised to the power of a first integer and a second RF signal raised to the power of a second integer. Additionally, the first RF signal is at a first frequency or frequency band, the second RF signal is at a second frequency or frequency band, and the RF product signal is at a third frequency or frequency band. The method also includes the steps of applying a cyclostationarity detection technique to the RF product signal, and identifying the RF product signal as an intermodulation distortion signal from the results of the application of the cyclostationarity detection technique to the RF product signal. In an embodiment, the first and second RF signals are transmitted by a communication system. In a further embodiment, the method further includes the step of determining whether the frequency or frequency band of the RF product signal is a frequency or frequency band transmitted by the communication system, i.e., whether the detected cyclostationary characteristic is expected in the frequency band.

In an embodiment, the first RF signal is transmitted by a first communication system and the second RF signal is transmitted by a second communication system. In a still further embodiment, the method includes the step of determining whether the third frequency or frequency band is a frequency or frequency band transmitted by either the first or second communication system, i.e., whether the detected cyclostationary characteristic is expected in the frequency band. The first and second communication systems may operate using different communication protocols.

As discussed above, the RF product signal is a product of a first RF signal raised to the power of a first integer and a second RF signal raised to the power of a second integer. In an embodiment, the first and second integers are the same. In another embodiment, the sum of the first and second integers equals three.

In yet a further embodiment, the RF product signal includes a cyclic prefix, as is known in the art. In still a further embodiment, the first and second RF signals each include a cyclic prefix having a predetermined length and the first and second RF signals are synchronized to within at least 75% of the predetermined length of the cyclic prefix.

In an embodiment, the cyclostationarity detection technique includes determining a cyclic autocorrelation function of the first signal. In another embodiment, the results of applying the cyclostationarity detection technique to the RF product signal include determining if the RF product signal includes a predetermined characteristic of either the first or second RF signal. The predetermined characteristic may be one or more of a cyclic prefix-induced cyclostationarity, a frame rate, and a chip rate.

In yet another embodiment, one or both of the first and second RF signals is a communication signal (e.g., a signal that is intended by the operator of a communication system to carry useful information), a communication signal in a wireless communication system, an Orthogonal Frequency Division Multiplexed ("OFDM") signal, or a Long Term Evolution ("LTE") signal. In still a further embodiment, one or both of the first and second RF signals is a communication signal in a wireless communication system but the RF product signal is not a communication signal in the wireless communication system. In yet still a further embodiment, one or both of the first and second RF signals is a tone, a modulated carrier, or noise.

Identifying Passive Intermodulation Distortion on UMTS Signals

The method to be applied for UMTS signals is identical to that for LTE signals. UMTS signals have specific cyclostationary signatures just as LTE signals have signatures such as those we have discussed. Cyclic frequencies at multiples of both the inverse chip time and the inverse frame time may be recognized in the various order product signals that occur as a result of PIM. Once again, these product signals will occur with frequency translations corresponding to the PIM order.

Candidate Algorithms for Identifying PIM

We now consider two possible algorithms for identifying PIM in the aggregate communication channels of a communication system. Typically, in an embodiment, these may be the entire downlink ("DL") of a wireless system in a given cell or sector. In both of these algorithms we operate under the assumption of operating in co-operation with the network (communication system) operator. Clearly, various other algorithms based on the techniques and procedures disclosed herein are possible.

In an embodiment, the network frequency plan for, e.g., a communication network is obtained. An assumption may be made regarding the presence of some form of PIM generating intermodulation of a specific form. Typically, the likelihood of PIM is initially set to zero. Then for each existing LTE channel pair compute where product signals could exist. These define a set of candidate frequency bins. In an embodiment, for the content in each such bin construct the complex envelope. In another embodiment, the candidate frequency bin content is first downconverted to baseband. With the complex envelope available, subject the complex envelope to cyclostationarity analysis. In an embodiment, one would tune to a particular bandwidth and run the CAF generating routines for a configurable time. Running such a routine for several minutes may be needed to draw cyclostationary features out of the noise. The hypotheses tests H1 and H2 as indicated above can now be performed. If one winds up with a positive result for H1 and a negative result for H2, then the likelihood of PIM in the candidate frequency bin is increased. In an embodiment, this procedure may be repeated over all candidate frequency bins. Finally, if the likelihood of PIM is greater than some configurable threshold, a decision that PIM exists in this aggregate of channels is made.

In an embodiment, the network frequency plan for, e.g., a communication network is obtained. Typically, the likelihood of PIM is initially set to zero. Partition the entire bandwidth to be tested into a set of frequency bins. In an embodiment, one may start with the smallest assignable LTE channel bandwidth and work up to the largest possible. In an embodiment, for the content in each such bin construct the complex envelope. In another embodiment, the candidate frequency bin content is first downconverted to baseband. With the complex envelope available, subject the complex envelope to cyclostationarity analysis. In an embodiment, one would tune to a particular bandwidth and run the CAF generating routines for a configurable time. Running such a routine for several minutes may be needed to draw cyclostationary features out of the noise. The hypotheses tests H1 and H2 as indicated above can now be performed. If one winds up with a positive result for H1 and a negative result for H2, then, in an embodiment, a computation is initiated. This computation calculates which possible LTE channel pair in the frequency plan could possibly generate a PIM product in the bin under test. The calculation is repeated for various possible intermodulation orders. If such a pair of valid LTE channels and a valid intermodulation order exists, the likelihood of PIM is increased. In an embodiment, the above procedure is repeated over all candidate frequency bins. Finally, if the likelihood of PIM is greater than some configurable threshold, a decision that PIM exists in this aggregate of channels is made.

Figure 5:
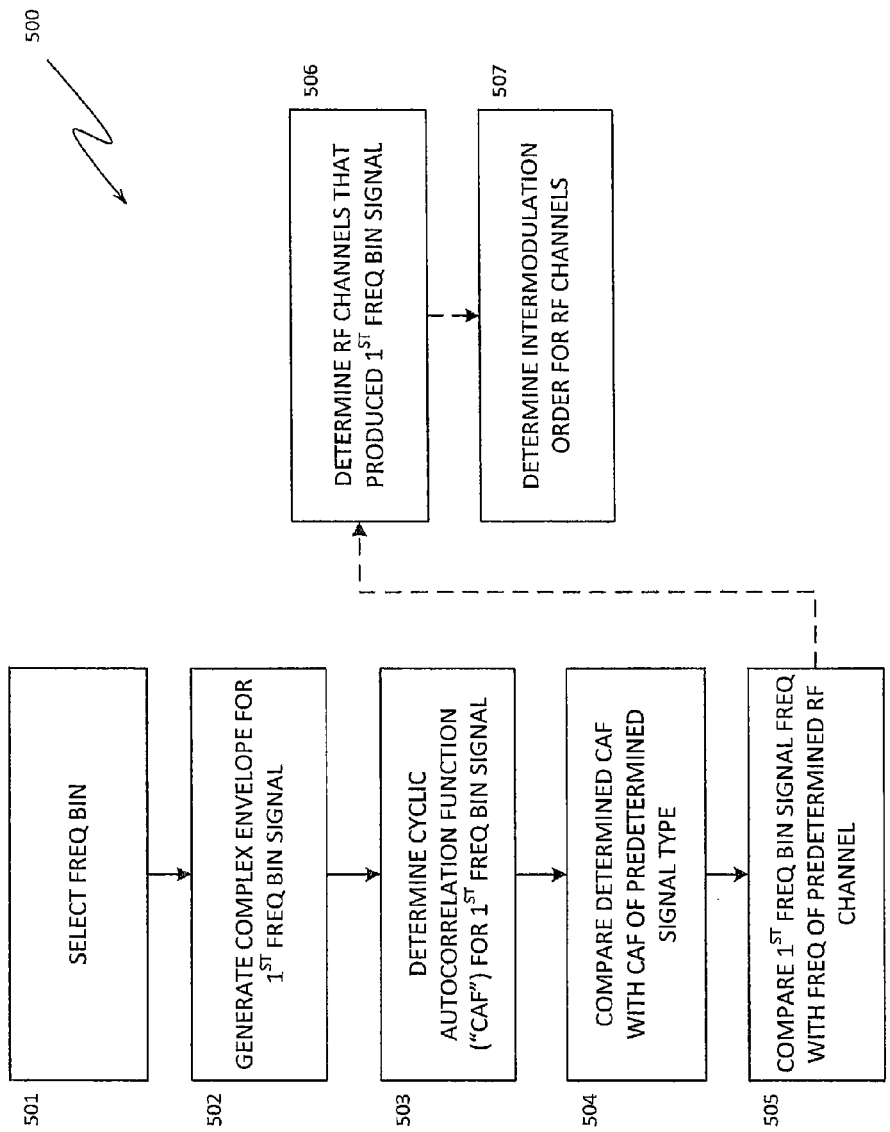
FIG. 5 is a flow chart for determining radio frequency signals causing intermodulation distortion according to an embodiment of the present subject matter.

Considering now FIG. 5, a flow chart for determining radio frequency signals causing intermodulation distortion according to an embodiment of the present subject matter is presented. At block 501, a frequency bin is selected. The frequency bin may be selected based on a pair of signals from the predetermined set of RF signals. At block 502, a complex envelope is generated for a first signal in the frequency bin. At block 503, a cyclic autocorrelation function ("CAF") for the first signal is determined. At block 504, the determined cyclic autocorrelation function is compared to a cyclic autocorrelation function for the predetermined signal type. At block 505, the frequency of the first signal is compared with the frequency of the predetermined set of RF channels.

In a further embodiment, at block 506, a plurality of the RF channels that produced the first signal is determined. In a still further embodiment, at block 507, an intermodulation order for each of the plurality of RF channels that produced the first signal is determined.

In another embodiment, the step of comparing the determined cyclic autocorrelation function to a cyclic autocorrelation function for the predetermined signal type includes determining if the first signal comprises a predetermined characteristic of the predetermined signal type. The predetermined characteristic may be one or more of a cyclic prefix-induced cyclostationarity, a frame rate, and a chip rate.

In yet another embodiment, one or both of the plural RF channels is a communication signal (i.e., a signal that is intended by the operator of a communication system to carry useful information) in either an uplink or downlink channel, an Orthogonal Frequency Division Multiplexed ("OFDM") signal, or a Long Term Evolution ("LTE") signal. In yet still another embodiment, the first signal is not a communication signal in the communication system. In a further embodiment, one or both of the plurality of RF channels is a tone, a modulated carrier, or noise.

Figure 6:
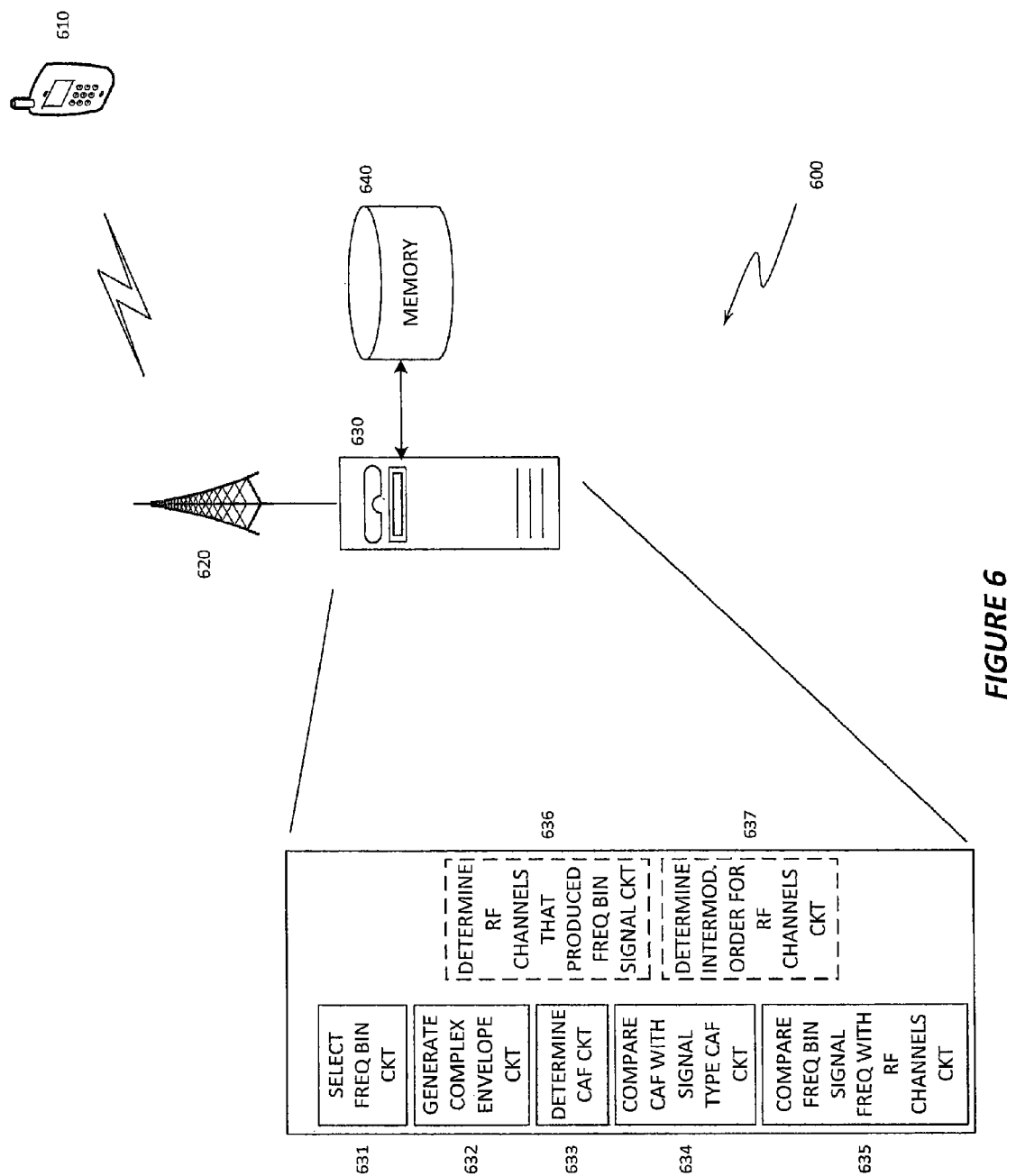
FIG. 6 is a functional block diagram for determining radio frequency signals causing intermodulation distortion according to an embodiment of the present subject matter.

FIG. 6 depicts a functional block diagram for determining radio frequency signals causing intermodulation distortion according to an embodiment of the present subject matter. In an embodiment, mobile device 610 communicates, via radio frequency ("RF") uplink and downlink channels, as is known in the art, with wireless transmitter 620 in a wireless communication network. The uplink and/or downlink channel may be composed of one or more frequency bands. It will be understood by those of skill in the art that the present exemplary embodiment is non-limiting and that other embodiments of the present disclosure, including use in a wired system, are contemplated herein. The wireless communication network also includes a processor 630 which is operatively connected to transmitter 620 and a memory device 640. The processor 630 includes frequency bin selection circuit 631, a complex envelope generation circuit 632, a cyclic autocorrelation function ("CAF") determining circuit 633, a CAF comparison circuit 634, and a frequency comparison circuit 635.

In another embodiment, circuit 631 includes circuitry for selecting the frequency bin based on a pair of signals from the predetermined set of RF signals.

In a further embodiment, processor 630 also includes circuit 636 which determines a plurality of the RF channels that produced the first signal. In a still further embodiment, processor 630 also includes circuit 637 which determines an intermodulation order for each of the plurality of RF channels that produced the first signal is determined.

In another embodiment, circuit 634 includes circuitry for determining if the first signal comprises a predetermined characteristic of the predetermined signal type. The predetermined characteristic may be one or more of a cyclic prefix-induced cyclostationarity, a frame rate, and a chip rate.

In yet another embodiment, one or both of the plural RF channels is a communication signal (i.e., a signal that is intended by the operator of a communication system to carry useful information) in either an uplink or downlink channel, an Orthogonal Frequency Division Multiplexed ("OFDM") signal, or a Long Term Evolution ("LTE") signal. In yet still another embodiment, the first signal is not a communication signal in the communication system. In a further embodiment, one or both of the plurality of RF channels is a tone, a modulated carrier, or noise.

In another embodiment, the processor 630 is programmed using a non-transitory machine-readable medium which stores executable instructions to be executed by the processor 630 to implement a method for determining radio frequency signals causing intermodulation distortion. In an embodiment, the method includes the steps of selecting a frequency bin, where the frequency bin may be selected based on a pair of signals from the predetermined set of RF signals, generating a complex envelope for a first signal in the frequency bin, determining a cyclic autocorrelation function for the first signal, comparing the determined cyclic autocorrelation function to a cyclic autocorrelation function for the predetermined signal type, and comparing the frequency of the first signal with the frequency of the predetermined set of RF channels.

In a further embodiment, the method includes the step of determining a plurality of the RF channels that produced the first signal. In a still further embodiment, the method includes the step of determining an intermodulation order for each of the plurality of RF channels that produced the first signal.

In another embodiment, the step of comparing the determined cyclic autocorrelation function to a cyclic autocorrelation function for the predetermined signal type includes determining if the first signal comprises a predetermined characteristic of the predetermined signal type. The predetermined characteristic may be one or more of a cyclic prefix-induced cyclostationarity, a frame rate, and a chip rate.

In yet another embodiment, one or both of the plural RF channels is a communication signal (i.e., a signal that is intended by the operator of a communication system to carry useful information) in either an uplink or downlink channel, an Orthogonal Frequency Division Multiplexed ("OFDM") signal, or a Long Term Evolution ("LTE") signal. In yet still another embodiment, the first signal is not a communication signal in the communication system. In a further embodiment, one or both of the plurality of RF channels is a tone, a modulated carrier, or noise.

Optional Pre-Filtering

In an embodiment, we may also note that in those cases where a region of spectrum to be examined contains a particular signal that is not of interest to us, it may be possible to use well known signal extraction techniques to first extract that particular signal and then subject the residual to cyclostationarity tests for the product signals of interest. Such methods may be viewed as nulling nuisance or interferer signals in the spectrum prior to searching for PIM. Note that such nulling may itself use a cyclostationary technique to remove an interferer if the cycle frequencies for this interferer are distinct from those of the product waveforms.

Operation with Multiple Signal Types

In another embodiment, consider a case where a PIM product of one signal type may occur in spectrum allocated to or containing a different signal type. An example of such a situation may be where an OFDM PIM product may occur in spectrum containing a UMTS signal. In such cases, one can apply cyclostationary techniques that ignore the second signal type. The CAF can be examined directly for cyclic frequencies corresponding to the OFDM signals. This is possible since the cyclic frequencies of the signal types are distinct. Generally, therefore, if two or more signal types coexist, provided they have different cyclostationary characteristics, one can compute the CAF for the aggregate signal (the total signal in the spectrum) and focus attention on the features one expects for the product signals of interest.

Distinguishing Product Signals from Non-Product Signals

In an embodiment, consider a situation where a tentative identification of a particular product signal type has been made using cyclostationary methods. Now it may happen that there is some non-zero probability that the examined spectrum may have contained a non-product signal of the same type from some far transmitter. In such cases, further processing may be needed to affirm or negate the decision on the signal type. One method of excluding a non-product signal would be to attempt to demodulate the signal in the spectrum using a standard demodulator for that signal type. Provided the SNR is high enough that such a demodulation can be performed, a product signal may not generate a valid demodulated signal. Thus a clean demodulation of the spectrum content may indicate that this cannot be a product signal. Note that in the case of OFDM, as we have shown in previous sections, the product signal could exhibit an expanded constellation. So in such cases, the demodulation will show a signal behavior that would not have been expected as a standard OFDM signal. Secondary techniques such as this or other modulation tests may need to be applied to further confirm or negate a decision on whether the source of a signal in some spectrum is PIM or some non-product signal (a regular transmission).

Exploiting PIM Induced Subcarrier Interaction in OFDM Signals

In an embodiment, when one examines the effect of PIM on a single LTE signal, an interesting feature of the LTE signal can be observed. An LTE signal, as discussed previously, is generated using OFDM. At a very rudimentary level OFDM is simply an aggregation of tones (subcarriers) with each tone having a particular amplitude and phase. Thus, one can resort to the very elementary exposition of PIM via tone interaction to argue that the effect of PIM on an OFDM signal is that new tones are generated with different amplitudes and phases.

Consider two subcarriers of an OFDM signal within an OFDM symbol duration. Let these two subcarriers be the tones with frequencies $f_1$ and $f_2$. If the subcarrier spacing is $\Delta f$, then with some integer value k, $f_2=f_1+k\Delta f$. Now assume there is third order PIM present in the channel carrying the signal. This can cause a product signal with frequency $f_{PIM}=2f_1-f_2$. Substituting for $f_2$ this gives $f_{PIM}=f_1-k\Delta f$. This tells us that a PIM product occurs at a frequency $k\Delta f$ below $f_1$. If $\Delta f=15$ kHz, then a PIM product occurs an integer multiple of 15 kHz below $f_1$.

Now considering all the subcarriers in the OFDM signal we see that these "self-product" terms generate signals at frequency shifts with an integer multiple of the subcarrier spacing from the original set of subcarriers. Some of the self-products may occur at frequencies that are completely distinct from the set of OFDM subcarriers. If these self-products can be recognized by some means then that would increase the likelihood that PIM is present in the signal channel.

Primary Synchronization Channel

As a particular example of how to exploit the PIM induced self-product of OFDM signals, in an embodiment, one can consider the Primary Synchronization Sequence ("PSS") in the Primary Synchronization Channel ("P-SCH") of LTE. In a Frequency Division Duplex ("FDD") LTE system, the PSS is mapped to the last symbol of slot number 0 and slot number 10 in a particular radio frame. In a Time Division Duplex ("TDD") system, the PSS is mapped to the third OFDM symbol in sub-frames 1 and 6. In either case, the manner in which this is done is to apply a specific complex domain Zadoff-Chu sequence to 62 middle subcarriers of a 72 subcarrier window. Thus there are 10 reserved subcarriers that do not have any applied data. It follows that tones induced by PIM will result in frequency components in these reserved subcarriers.

Since the PSS repeats cyclically every half-frame with exactly the same data (the Zadoff-Chu sequence) then one can propose the recognition of the PIM induced energy. To implement this we can exploit the highly efficient and elegant aspect of OFDM demodulation offered by the Fast Fourier Transform ("FFT"). Consider the 72-point FFT that may be applied to data demodulate the content of the PSS carrying symbol. Clearly if there were no PIM, there should be no data (energy) in the reserved subcarriers after an FFT demodulation. With PIM on the other hand, there will be data in these subcarriers, hence the FFT will result in some frequency domain content in the reserve subcarriers. Since the PSS is periodic, the frequency domain content will also be periodic. Thus, one could consider the autocorrelation of the P-SCH in the frequency domain which will then exhibit a cyclostationary feature. One could also interpret this as a delay-multiply-integrate loop where the delay is a half-frame and where the multiply is the multiplication of the frequency bins corresponding to the reserve subcarriers, and where the integration is simply a continuing addition of output of the multiplier. The processing gain offered by the integration is limited only by the drift of the PIM behavior over time. If the PIM is static, the method should virtually guarantee detection.

It should be noted that even if there were no reserved subcarriers (essentially a set of frequency bins where no signal exists), any periodically recurring PIM product of a fixed set of subcarriers could be recognized by the above means. The requirement for this to be possible is that the PIM product should not share spectrum with some other signal which is also periodic with the same period. Thus, if the PIM generated signal were to fall where some other random non-periodic signal did, the PIM product should still be detectable (albeit with greater processing effort).

Certain embodiments of the present disclosure may be implemented by a general purpose computer programmed in accordance with the principals discussed herein. It may be emphasized that the above-described embodiments are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for determining intermodulation distortion in a communication system which operates using a predetermined set of radio frequency ("RF") channels and a predetermined signal type, the method comprising the steps of:
   (a) selecting a frequency bin;
   (b) generating a complex envelope for a first signal in the frequency bin, wherein the first signal is a product of a plurality of RF channels;
   (c) determining a cyclic autocorrelation function for the first signal;
   (d) comparing the determined cyclic autocorrelation function to a cyclic autocorrelation function for the predetermined signal type; and
   (e) comparing the frequency of the first signal with the frequency of the predetermined set of RF channels.

2. The method of claim 1 further comprising the step of:
   (f) determining the plurality of the RF channels that produced the first signal.

3. The method of claim 2 further comprising the step of:
   (g) determining an intermodulation order for each of the plurality of RF channels that produced the first signal.

4. The method of claim 1 wherein the frequency bin is selected based on a pair of signals from the predetermined set of RF signals.

5. The method of claim 1 wherein step (d) includes determining if the first signal comprises a predetermined characteristic of the predetermined signal type.

6. The method of claim 5 wherein the predetermined characteristic is selected from the group consisting of: cyclic prefix-induced cyclostationarity, frame rate, and chip rate.

7. The method of claim 1 wherein at least one of the plurality of RF channels is selected from the group consisting of: a communication signal, an Orthogonal Frequency Division Multiplexed ("OFDM") signal, and a Long Term Evolution ("LTE") signal.

8. The method of claim 1 wherein the first signal is not a communication signal in the communication system.

9. The method of claim 1 wherein at least one of the plurality of RF channels is selected from the group consisting of: a tone, a modulated carrier, and noise.

10. A system for determining intermodulation distortion in a communication system which operates using a predetermined set of radio frequency ("RF") channels and a predetermined signal type, comprising:
   a first circuit for selecting a frequency bin;
   a second circuit for generating a complex envelope for a first signal in the frequency bin, wherein the first signal is a product of a plurality of RF channels;
   a third circuit for determining a cyclic autocorrelation function for the first signal;
   a first comparison circuit for comparing the determined cyclic autocorrelation function to a cyclic autocorrelation function for the predetermined signal type; and
   a second comparison circuit for comparing the frequency of the first signal with the frequency of the predetermined set of RF channels.

11. The system of claim 10 further comprising a fourth circuit for determining the plurality of the RF channels that produced the first signal.

12. The system of claim 11 further comprising a fifth circuit for determining an intermodulation order for each of the plurality of RF channels that produced the first signal.

13. The system of claim 11 wherein said first circuit selects said frequency bin based on a pair of signals from the predetermined set of RF signals.

14. The system of claim 10 wherein said first comparison circuit includes circuitry for determining if the first signal comprises a predetermined characteristic of the predetermined signal type.

15. The system of claim 10 wherein the predetermined characteristic is selected from the group consisting of: cyclic prefix-induced cyclostationarity, frame rate, and chip rate.

16. The system of claim 10 wherein at least one of the plurality of RF channels is selected from the group consisting of: a communication signal, an Orthogonal Frequency Division Multiplexed ("OFDM") signal, and a Long Term Evolution ("LTE") signal.

17. The system of claim 10 wherein the first signal is not a communication signal in the communication system.

18. The system of claim 10 wherein at least one of the plurality of RF channels is selected from the group consisting of: a tone, a modulated carrier, and noise.

19. A non-transitory machine-readable medium having stored thereon a plurality of executable instructions to be executed by a processor to implement a method of determining intermodulation distortion in a communication system which operates using a predetermined set of radio frequency ("RF") channels and a predetermined signal type, the method comprising the steps of:
   (a) selecting a frequency bin;
   (b) generating a complex envelope for a first signal in the frequency bin, wherein the first signal is a product of a plurality of RF channels;
   (c) determining a cyclic autocorrelation function for the first signal;
   (d) comparing the determined cyclic autocorrelation function to a cyclic autocorrelation function for the predetermined signal type; and
   (e) comparing the frequency of the first signal with the frequency of the predetermined set of RF channels.

20. The non-transitory machine-readable medium of claim 19 wherein the method implemented further comprises the step of:
   (f) determining the plurality of the RF channels that produced the first signal.

21. The non-transitory machine-readable medium of claim 20 wherein the method implemented further comprises the step of:
   (g) determining an intermodulation order for each of the plurality of RF channels that produced the first signal.

22. The non-transitory machine-readable medium of claim 19 wherein the frequency bin is selected based on a pair of signals from the predetermined set of RF signals.

23. The non-transitory machine-readable medium of claim 19 wherein step (d) includes determining if the first signal comprises a predetermined characteristic of the predetermined signal type.

24. The non-transitory machine-readable medium of claim 23 wherein the predetermined characteristic is selected from the group consisting of: cyclic prefix-induced cyclostationarity, frame rate, and chip rate.

25. The non-transitory machine-readable medium of claim 19 wherein at least one of the plurality of RF channels is selected from the group consisting of: a communication signal, an Orthogonal Frequency Division Multiplexed ("OFDM") signal, and a Long Term Evolution ("LTE") signal.

26. The non-transitory machine-readable medium of claim 19 wherein the first signal is not a communication signal in the communication system.

27. The non-transitory machine-readable medium of claim 19 wherein at least one of the plurality of RF channels is selected from the group consisting of: a tone, a modulated carrier, and noise.

* * * * *